United States Patent [19]

Smith et al.

[11] 3,710,352

[45] Jan. 9, 1973

[54] HIGH SPEED-LARGE STORAGE CAPABILITY ELECTRON BEAM ACCESSED MEMORY METHOD AND APPARATUS

[75] Inventors: Donald O. Smith, Lexington; Kenneth J. Harte, Carlisle; Mitchell S. Cohen, Watertown; Sterling P. Newberry, Carlisle; Dennis E. Speliotis, Lexington, all of Mass.

[73] Assignee: Micro-Bit Corporation, Burlington, Mass.

[22] Filed: March 13, 1970

[21] Appl. No.: 19,379

[52] U.S. Cl. .........................340/173.2, 340/173 CR

[51] Int. Cl. .............................................G11c 11/22

[58] Field of Search........340/173.2, 173 CR, 173 LT

[56] References Cited

UNITED STATES PATENTS

| | | | |
|---|---|---|---|
| 3,164,816 | 1/1965 | Chang et al. | 340/173 LT |
| 3,435,425 | 3/1969 | Hastings | 340/173.2 |
| 3,531,779 | 9/1970 | Hopkins et al. | 340/173.2 |
| 3,508,213 | 4/1970 | Hastings | 340/173.2 |
| 2,922,986 | 1/1960 | Chynoweth | 340/173.2 |
| 2,926,336 | 2/1960 | Chynoweth | 340/173.2 |
| 3,423,654 | 1/1969 | Hellmeier et al. | 340/173.2 |
| 3,531,182 | 9/1970 | Land et al. | 340/173.2 |
| 3,582,877 | 6/1971 | Benoit | 346/74 MT |
| 3,611,420 | 10/1971 | Benoit | 346/74 MT |

*Primary Examiner*—Stanley M. Urynowicz, Jr.
*Attorney*—Charles W. Helzer

[57] ABSTRACT

A high speed memory using a thin film ferroelectric storage medium and high speed, selectively directed heating means in the form of an electron beam for selectively heating discrete bit storage areas on the ferroelectric storage medium to a temperature in the vicinity of the Curie point, and subsequently applying a low voltage polarizing potential across the ferroelectric storage medium during cooling of the selectively heated discrete bit storage areas below the Curie point whereby polarized charges are permanently frozen into the discrete areas selectively to form unique bits of recorded information. The low voltage polarizing potential is selectively reversible whereby different polarity charges may be formed at the selected different discrete areas on the ferroelectric storage medium. The ferroelectric storage medium preferably comprises a thin ferroelectric film, on the order of a few thousand angstroms thick which may be sandwiched between two thin metal films of several hundred angstrom units thickness, or alternatively may be sandwiched with a semiconductor layer between two thin metal films. Non-destructive read-out is accomplished by redirecting the electron-beam to a previously written polarized area to heat it below the Curie point and detecting the pyroelectric current. Alternatively, the read-out electron beam can be adjusted to probe the depletion and accumulation regions induced in the semi-conductor layer by the polarized charges in the ferroelectric film. The electron beam writing and reading apparatus is of the type having a compound arrangement of a matrix of fine lenslets arrayed in a common plane with each lenslet having its own focusing and deflection system for focusing and directing the electron beam onto different discrete areas of the ferroelectric storage medium within an area of view unique to each lenslet. A suitable electron source followed by a coarse focusing and deflection system directs an electron beam to a selected one of the fine lenslets to activate that lenslet and selectively record a bit of information on the discrete area of the ferroelectric recording medium within the unique field of view of the selected lenslet. The memory is capable of storing $10^8$ bits of information in discrete areas on the order of 1 micron in diameter over the surface of a ferroelectric storage medium approximately one centimeter by one centimeter square with recording/read out speeds of at least one bit per microsecond or faster. Extremely large, storage capability memory systems may be formed with such memories having a storage capacity on the order of $10^{10}$ bits randomly accessible at speeds of at least one bit per microsecond by including $10^2$ high speed memory units constructed in the above-described manner arrayed in a common system and having a central common controller for accessing simultaneously each one of the high speed memory units in response to instructions from a computer system input-output equipment and supplying the selected information to an output circuit for connecting the output from each of the high speed memory units to the computer input-output equipment.

46 Claims, 12 Drawing Figures

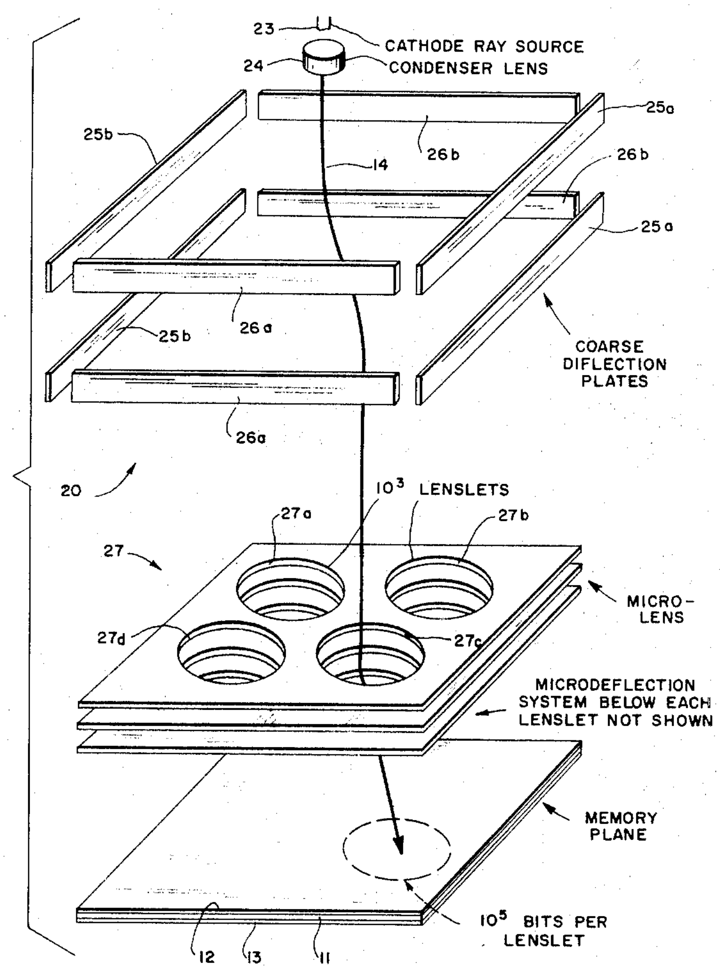
23
CATHODE RAY SOURCE
24
CONDENSER LENS
25a
25b
26b
14
26b
25a
25b
26a
COARSE DIFLECTION PLATES
26a
20
$10^3$ LENSLETS
27a
27b
27
MICRO-LENS
27d
27c
MICRODEFLECTION SYSTEM BELOW EACH LENSLET NOT SHOWN
MEMORY PLANE
$10^5$ BITS PER LENSLET
12
13
11

INVENTORS
DONALD O. SMITH
KENNETH J. HARTE
MITCHELL S. COHEN
STERLING P. NEWBERRY
DENNIS E. SPELIOTIS

BY Charles W. Helzer
ATTORNEY

INVENTORS
DONALD O. SMITH
KENNETH J. HARTE
MITCHELL S. COHEN
STERLING P. NEWBERRY
DENNIS E. SPELIOTIS

BY Charles W. Helzer
ATTORNEY

INVENTORS
DONALD O. SMITH
KENNETH J. HARTE
MITCHELL S. COHEN
STERLING P. NEWBERRY
DENNIS E. SPELIOTIS

BY Charles W Helzer
ATTORNEY

INVENTORS
DONALD O. SMITH
KENNETH J. HARTE
MITCHELL S. COHEN
STERLING P. NEWBERRY
DENNIS E. SPELIOTIS

BY *Charles W. Helzer*
ATTORNEY

INVENTORS
DONALD O. SMITH
KENNETH J. HARTE
MITCHELL S. COHEN
STERLING P. NEWBERRY
DENNIS E. SPELIOTIS

BY Charles W. Helzer
ATTORNEY

INVENTORS
DONALD O. SMITH
KENNETH J. HARTE
MITCHELL S. COHEN
STERLING P. NEWBERRY
DENNIS E. SPELIOTIS

BY Charles W. Helzer
ATTORNEY

INVENTORS
DONALD O. SMITH
KENNETH J. HARTE
MITCHELL S. COHEN
STERLING P. NEWBERRY
DENNIS E. SPELIOTIS

BY Charles W. Helzer
ATTORNEY

HIGH SPEED-LARGE STORAGE CAPABILITY ELECTRON BEAM ACCESSED MEMORY METHOD AND APPARATUS

BACKGROUND OF INVENTION

1. Field Of Invention

This invention relates to high speed memory systems for electronic computers.

More particularly, the invention relates to a high speed-large storage capability memory method and system using thin film ferroelectric storage mediums and Curie point writing.

2. Prior Art

Large electronic computer systems presently are comprised of four major subsystems-central memory, peripheral storage, control and input-output equipment. At the present time there is an urgent need for larger and faster memories for use in such systems either as the central memory or peripheral storage. Present day computers rely on hierachy of memories of different characteristics, size (measured in number of bits of information stored), speeds, and modes of access.

Today, the central, random-access memory employed in most large electronic computer systems consists of magnetic cores, although thin magnetic films are sometimes used. A fast (approximately 0.25 microsecond cycle time) core memory may be used to store moderate amounts of information which must be accessed quickly, while "extended" core memories can store more information at the cost of longer access times. Disc memories are sequentially accessed and used to store larger numbers of less often used bits and the speed is much slower ($8 \times 10^4$ micro-seconds). Table I lists the present day types of memories used in electronic computer systems and compares their relative speed, size and cost per bit of information stored. Table I also lists the characteristics of the memory disclosed herein for purpose of comparison to existing memories.

To meet the needs of future computers the memory must combine large bit capacity with rapid random access and still keep the cost below the national debt. For example, a fast core memory of $10^{10}$ bits capacity and a cost of 20 cents per bit would cost 2 billion dollars!

The comparison of memory techniques on a cost/size/speed basis is as follows: TABLE I

| Type | Speed (microsecond) | Present size limit (bits) | Cost per bit (cents) |
|---|---|---|---|
| Fast central core | 0.25 | $10^6$ | 20–25 |
| Extended core | 3–7 | $10^7$ | 1–2 |
| Disk | 80,000 | $10^9$ | 0.1 |
| Proposed memory | 1 | $10^{10}$ | 0.002 |

The capabilities of a computer memory can be measured by the product of the speed and the total number of bits which it can store. A good indication of the practical, maximum number of bits which can be stored in a memory has been found to be the spacial density of bits so that consequently an expression indicative of the storage capability of a memory can be obtained from the following relation:

$$\text{memory capability} = \text{speed} \times \text{density}.$$

Existing computer memory technology is dominated by magnetic materials. For example, ferrite cores, permaloy films, magnetic tapes and magnetic disks are used profusely. For a ferrite core random-access memory, the speed-density product is severely limited by fabrication problems of making smaller and smaller cores. Likewise magnetic-film memories are limited by the very small signals which are available from the film memory cells. In both instances the upper bound on speed × density is approximately $10^3$ bits/(centimeter$^2$-microsecond).

The computer memory composed herein utilizes a thin ferroelectric film as the storage medium with information being stored in discrete area (bits) which are only one micron in diameter and which can be written-in or read-out in one microsecond or less. Hence, the speed-density product becomes:

$$\text{speed} \times \text{density} = 10^8 \text{bits/(centimeter}^2\text{-microsecond)}.$$

From a consideration of the above expression, it will be seen that the proposed memory makes available a basic improvement in memory technology of a factor of $10^5$. From another view point, which takes into account the cost of the memory, the speed (1 microsecond) of the predominate present-day central memories will be retained, but the total number of bits will be increased by four orders of magnitude while the cost per bit is decreased by four orders of magnitudes as will be appreciated from a consideration of Table I.

SUMMARY OF INVENTION

In order to provide a memory of $10^{10}$bits, it is essential to employ a storage medium which is uniform. Obviously, $10^{10}$ individual bits cannot each be fabricated, and hence the bit-selection wires used in conventional memories must be avoided. The solution is to use a movable beam which, upon impinging on a given small discrete area (say 1 micron) of the uniform storage medium, induces either writing (recording information) or reading (retrieving information).

The chosen uniform storage medium is a ferroelectric film. Ferroelectric materials are the electrostatic analog of ferromagnetic materials;however, the energy stored in a ferroelectric bit is more than $10^9$ greater than the energy stored in a ferromagnetic bit of the same size. This permits a large signal-to-noise ratio allowing in turn, up to $10^7$ bits per detecting circuit so that the read-electronics system can be simpler and cheaper. Additionally, there are no interactions between ferroelectric bits so that the packing density is not limited as in the ferromagnetic case. Further, ferroelectric material can be used at room temperature. Additional desirable attributes are that the transition regions between the bits (domain walls) are only a few atomic spacings wide allowing greater packing density and their tolerances on the material properties of ferroelectric materials are quite wide.

Of the plausible types of movable beams available, light and electron, the electron beam can be moved with greater accuracy and speed. There is no presently known way to rapidly and accurately deflect a laser beam to any one of a large number of densely packed information bit recording positions, basically because the forces on light are very weak. Furthermore, an electron beam, which can be focused to a one micron diameter spot, can carry enough energy to heat the discrete area in which a bit is to be recorded, and this heating may then be used to effect both writing and reading. Either operation, even though it is thermal in nature, can be very fast if the bit area is small enough. Calculations made in connection with the presently proposed system predict a heating or cooling time on the order of 1 microsecond per bit or less.

It is therefor a primary object of the present invention to provide a family of novel, high-speed, electron beam accessed, large storage capability memories for use with electronic computer systems.

Another object of the invention is to provide new and improved computer memory systems utilizing such memories which are capable of randomly recording and/or reading out on the order of $10^{10}$ bits of information stored on one micron bit sites at access speeds of at least one bit per microsecond or faster and at a cost of about 0.002 cents per bit.

A still further object of the invention is to provide a new and improved method and apparatus for Curie point writing on thin film ferroelectric storage mediums in the presence of low voltage polarizing potentials.

A still further object of the invention is to provide new and improved information storage mediums employing thin film ferroelectrics for recording purposes.

In practicing the invention a high speed memory is provided which utilizes a ferroelectric storage medium. A high speed selectively directed heating means in the form of an electron beam write/read apparatus, selectively heats discrete storage areas on the ferroelectric storage medium to a temperature in the vicinity of the Curie point of the ferroelectric storage medium. To achieve permanent recording, means are provided for applying a low voltage polarizing potential across the feroelectric storage medium during cooling of the selectively heated discrete storage areas below the Curie point whereby a polarized charge is permanently frozen into each discrete area selectively to form a unique bit of recorded information. The means for applying the low voltage polarizing potential preferably is selectively reversible whereby different polarity charges may be formed at selected different discrete areas on the ferroelectric storage medium representing binary one and binary zero information bit sites.

Non-destructive read-out is accomplished by redirecting the electron-beam to a previously written polarized area to heat it below the Curie point and detecting pyroelectric current flow that results from such heating. Alternatively, the read-out electron beam can be adjusted to probe the depletion or accumulation regions induced in a semi-conductor layer by the polarized charges in the ferroelectric film.

The ferroelectric storage medium preferably comprises a thin ferroelectric film having a thickness on the order of a few thousand angstrom units (A) sandwiched between two thin metal films having a thickness of several hundred A. Alternatively, the ferroelectric film may be formed over a semiconductor substrate with the thin metal films deposited over the remaining, exposed surfaces of the ferroelectric film and the semiconductor substrate to form a metal-ferroelectric-semiconductor-metal sandwich. The ferroelectric film preferably is formed from the class of materials comprising $BaTiO_3$ and $Pb(Ti{\cdot}Zr{\cdot}Sn)O_3$ and the like.

The electron beam write/read apparatus preferably is of the type having a compound arrangement of a matrix of fine lenslets arrayed in a common plane with each lenslet having its own focusing and deflection system for focusing and directing an electron beam onto different discrete areas of the ferroelectric storage medium within an area of view unique to each lenslet. A coarse focusing and deflection system is provided which is capable of focusing electrons from an electron source into a beam and directing it to a selected fine lenslet for activating that lenslet and selectively recording a bit of information on a discrete area of the ferroelectric recording medium within the unique field of view of the selected lenslet. A memory constructed in this manner is capable of storing or reading-out $10^8$ bits of information in discrete areas on the order of 1 micron in diameter on the surface of a ferroelectric storage medium approximately 1 centimeter$^2$ and at recording/read-out speeds of at least one bit per microsecond or better.

A high speed large storage capability memory system having a storage capacity on the order of $10^{10}$ bits randomly accessible at the speed of one bit per microsecond, is made possible by arranging 100 high speed memory units constructed as described above in a common system having a central common controller for selecting and controlling a desired one of the high speed electron beam accessed memory units in response from a computer system input-output equipment and a common output circuit selectively connectable to the output from a selected one of the high speed electron beam accessed memory units.

BRIEF DESCRIPTION OF DRAWINGS

Other objects, features and many of the attendant advantages of this invention will be appreciated more readily as the same becomes better understood by reference to the following detailed description when considered in connection with the accompanying drawings, wherein like parts in each of the several figures are identified by the same reference character, and wherein.

DETAIL DESCRIPTION OF THE PREFERRED EMBODIMENTS

Electron Beam-Accessed Memory Method and System

Figures 1, 3:
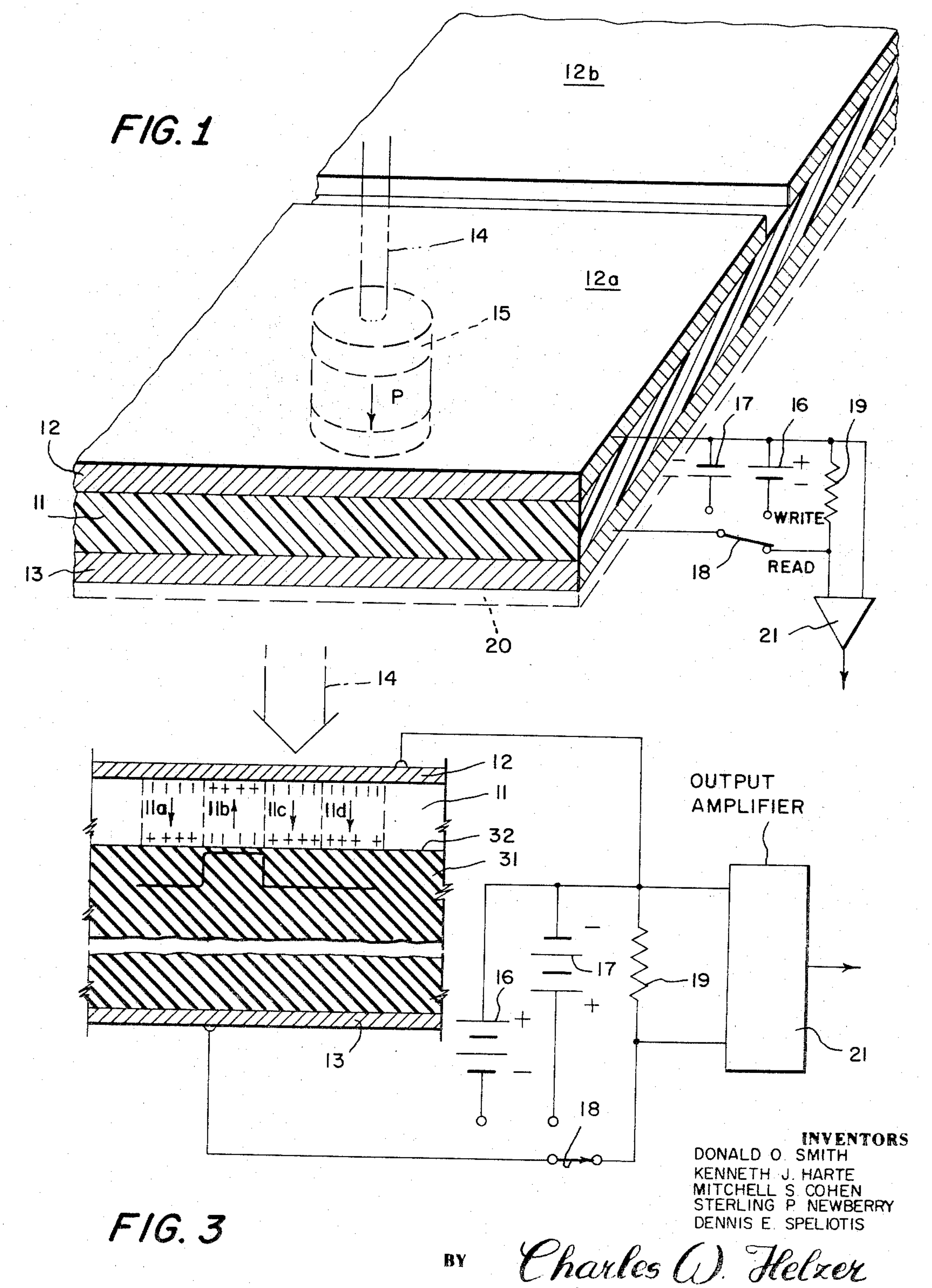
FIG. 1 is a schematic perspective view of a ferroelectric film information storage medium constructed in accordance with the invention employing schematically illustrated write/read circuitry and a moveable electron beam for depicting a method of writing and reading in accordance with the invention.
FIG. 3 is a partial, sectional view of a different form of ferroelectric storage medium utilizing a semiconductor substrate layer for use in practicing the invention.

The principles of operation of the novel memory method and system using thin film ferroelectrics can best be explained with reference to FIGS. 1 and 2 of the drawings. In FIG. 1, a thin film ferroelectric storage medium is shown at 11 having thin metal films 12 and 13 formed on its opposite flat surfaces. The ferroelectric film 11 will be described in greater detail hereinafter; however, for the purpose of the present disclosure it is considered to be a few thousand A thick where 1 A unit equal $10^{-8}$ centimeters. The metal films 12 and 13 may have a thickness on the order of from 100 to 500 A units and are fabricated from a metal such as aluminum which is vapor deposited, sputtered, etc. onto the flat exposed surface of the ferroelectric film. Because of the thinness of the layers 11,12,13, they may have to be fabricated on a suitable substrate of glass, sapphire, or the like shown in phantom at 20. The substrate does not enter into the operation of the memory element except for its thermal effect as discussed later and may or may not be present depending upon the economics and/or operational constraints of a particular application.

In order to write (record) information on the ferroelectric recording medium 11, an electron beam indicated at 14 is directed upon a discrete area of the metal-ferroelectric-metal structure as shown generally in dotted outline form at 15. In the discrete area 15, which may be on the order of one micron in diameter, the impingement of the electron beam heats the ferroelectric film 11 above its Curie temperature. At this point, or at some point prior to attaining the Curie temperature, a low voltage polarizing potential, indicated by the battery sources 16 and 17, is applied across the metal-ferroelectric-metal sandwich through a selector switch 18. It should be noted that while the selector switch 18 is depicted as a mechanically operable switch, in any practical high speed memory, high speed logic gates or other high speed switching circuits would be employed in the place of mechanical switch 18. If the switch contact 18 is closed on the battery source 16, upon removal of the electron beam 14 and subsequent cooling of the discrete area 15 below the Curie point, the discrete area 15 becomes polarized with a polarization P which is in the direction of the electric field of the potential source 16 as indicated by the arrow. This polarized charge becomes frozen into the ferroelectric film upon the temperature of the discrete area returning to ambient in the presence of the polarizing potential and will be retained indefinitely.

If a positive polarity potential is applied from the source 16 to the top metal film 12, the polarization P assumes a downward direction which by definition will be assumed to the binary "1" condition. Alternatively, if a negative polarity potential from the source 17 is applied to the top metal film 12 during cooling of the discrete area 15 below the Curie point, the polarization P assumes an upward direction and a binary "0" is written. An important feature of this "curie point writing" is that only small polarizing fields on the order of 2–6 volts are necessary. However, higher polarizing potentials can be employed if desired. It is preferred, however, that as small a polarizing potential as feasible be used since it insures stability of previously recorded adjacent bit in the rest of the memory against disturbance during writing at any given discrete area (bit site). While batteries have been indicated as comprising the polarizing potential source, it is believed obvious that other known, low voltage sources can be employed to provide the required polarizing field during the cooling phase of a writing operation.

In order to read-out previously recorded information, the electron beam 14 is again caused to strike the discrete area 15 forming an information bit site. During the reading interrogation the polarizing potential sources 16 and 17 are disconnected. Additionally, the energy level of the interrogating read-out electron beam 14 may be reduced so as not to heat the discrete area 15 to its Curie point. Upon heating to a temperature which is in excess of ambient but below the Curie temperature, the polarization P will decrease, causing a "pyroelectric current" flow through an output circuit comprised by a load resistor 19 and suitable output sense amplifier 21 connected across metal films 12 and 13. The voltage across the load resistor 19 is detected and amplified by the output amplifier 21 and supplied through suitable connecting circuitry (not shown) to the remainder of the computer system with which the memory is used. The polarity of the output signal developed across load resistor 19 depends upon the direction of polarization P, that is, whether a "1" or a "0" had been stored in the manner described above. Since the Curie temperature is not exceeded during read-out, reading is non-destructive to the stored information. For a more detailed description of the "-pyroelectric current" read-out phenomena, reference is made to an article entitled "Dynamic Method for Measuring the Pyroelectric Effect with Special Reference to Barium Titanate" by A.G. Chynoweth appearing in the Journal of Applied Physics—Vol. 27, Number 1January 1956, and to the article entitled "A New Method For Studying Movements of Electric Domain Walls" by J.C. Burfoot and R. V. Latham appearing in the British Journal of Applied Physics, 1963, Volume 14, Page 933.

Figure 2:
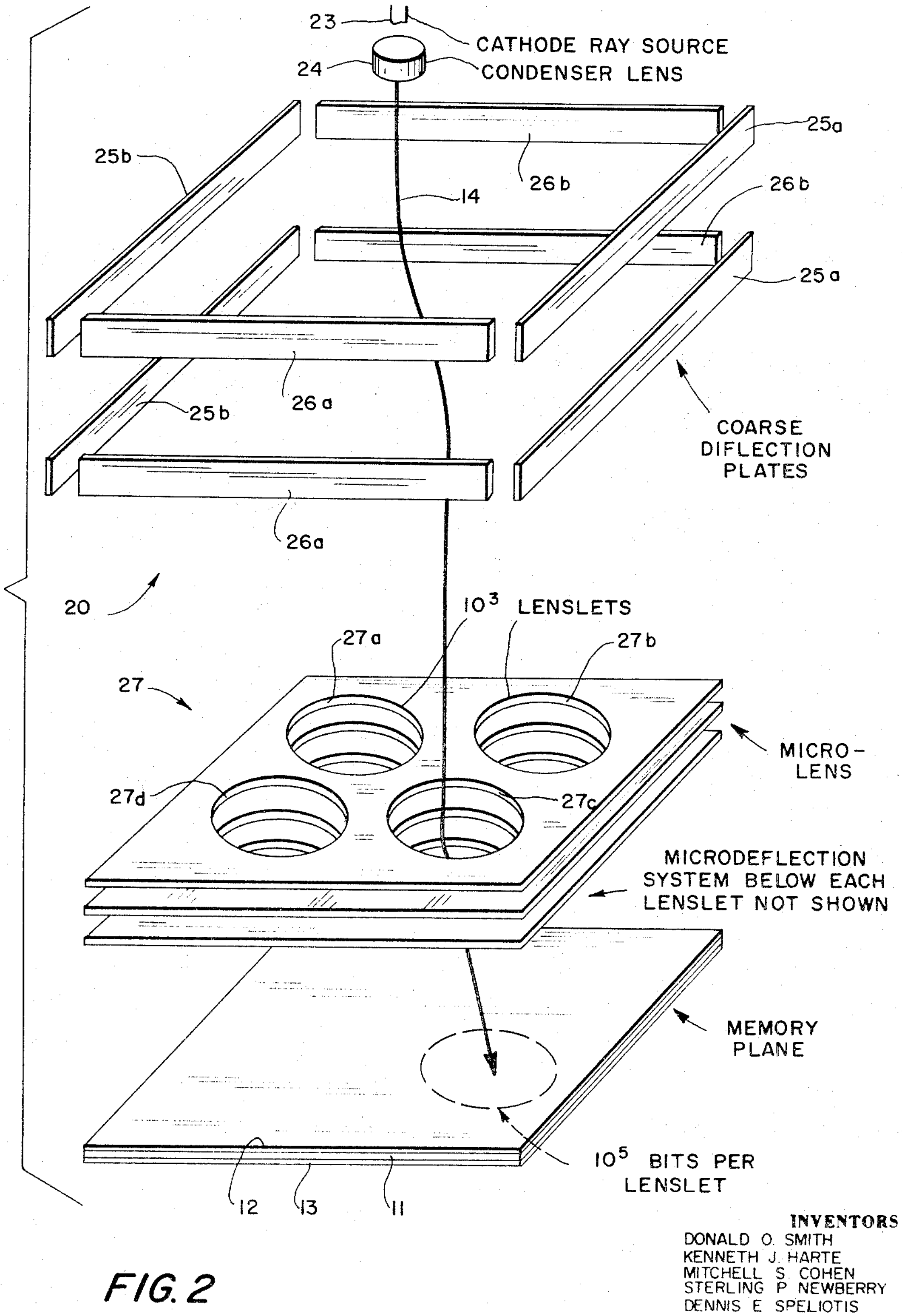
FIG. 2 is a schematic illustration of an electron beam write/read apparatus having a compound focusing and deflecting system for use in practicing the invention.

FIG. 2 is a schematic perspective view of a suitable electron beam write/read apparatus optical system for use in practicing the invention. The electron-optical system shown in FIG. 2, functions to focus an image of the electron source to a small spot on the memory plane and reproducibly and reliably deflects the spot to any point of the memory plane. As explained more fully hereinafter, the goal of at least $10^{10}$ bits is achieved by arranging 100 or $10^2$ electron beam-accessed memory tubes such as shown in FIG. 2 in a common memory system with each memory tube containing an electron beam optical system for accessing to $10^8$ bits on a 1 centimeter by 1 centimeter square metal-ferroelectric-metal memory plane. In any such system, two primary problems are encountered. The first is the obtaining of sufficient electron beam current to heat a discrete area of the ferroelectric film (bit site) to the required Curie temperature, and the second is in providing a deflection system which permits reproducible accessing of any one information bit site from $10^8$ bits. The electron-optical system shown in FIG. 2 having a compound lens arrangement including an array of fine lenslets disposed in a common plane spaced a short focal distance above the memory plane, provides the solution to both of these problems.

The electron optical system shown in FIG. 2 includes a cathode ray source or sources 23 (or possibly an ion source) which, as is well known in the art, may comprise a suitable electron emissive cathode, a first accelerating grid and an apertured first anode for forming and projecting a beam of electrons towards the memory plane 11 that is comprised by the metal-ferroelectric-metal sandwich structure shown in FIG. 1 in greater detail. The electrons 14 first traverse a suitable condenser lens 24 for further concentrating and defining the electrons into a beam 14. The beam 14 then traverses a set of opposed, coarse deflecting electrodes **25*a* and 25*b* for deflecting the electron beam 14 along the X-axis, and a set of orthogonally displayed deflecting electrodes 26*a* and 26*b* which co-act to deflect the electron beam 14 along the Y-axis. The coarse or main deflecting electrodes 25 and 26 operate on the electron beam 14 in a manner to cause it to pass through a selected one of $10^3$ lenslets 27*a*, 27*b*, 27*c* etc that comprise a part of a micro deflection system to be described more fully hereinafter. Alternatively, in place of the orthogonally deflected electron beam a fan-shaped beam of electrons for flooding a line of lenslets, and only a single deflecting electrode for deflecting the fan-shaped beam of electrons may be used to select and activate a desired lenslet. The microdeflection system includes a set of fine deflecting electrodes (not shown in FIG. 2) that coact with each one of the individual lenslets 27*a*, 27*b*, etc to cause the electron beam to be further deflected in the X and Y-axis directions in accordance with the deflecting signals supplied to these fine deflecting electrodes. The microdeflection system shown generally at 27** has been referred to in the art as a fly's eye electron-lens structure because of its similarity in many respects to the multiple lens construction of a fly's eye.

Compared to glass (optical) lenses, electron lenses have enormous spherical aberration, so that to form an acceptable image the lens aperture must be greatly reduced. This requirement in turn results in greatly reducing the beam current that can be delivered by an electron beam to the memory plane. For this reason it is desirable to use electron lenses of short focal length since they have lower spherical aberration and can therefor deliver a large beam current. However, the requirement for a short focal length imposes the condition that the lens must be placed very close to the memory plane in order to form an image of the electron source. This in turn means that the field of view of the lens (number of bit sites accessible to the lens) is reduced. Thus, if the field of view of each lenslet (and its associated microdeflecting electrodes), is $10^5$ bit sites, an array of $10^3$ lenslets arranged in a common plane as shown schematically at 27, will permit a high current electron beam to access $10^8$ bits in a single electron tube.

In addition to the above desirable characteristic features, the tolerance requirements on the electron beam positioning are reduced substantially by the proposed electron-optical system employing a fly's eye lens structure. With such a structure, an accuracy of only one part in 300 in each of the coarse or main deflection plate voltages is required to chose a desired lenslet, and hence a desired field of $10^5$ bit sites. Further, only one part in $3 \times 10^3$ accuracy is needed for the micro deflection system comprising a part of each of the lenslets in order to access a desired bit site within the unique field of view of a particular lenslet. If the fly's eye lens arrangement were not used, and only one lens were involved, an accuracy of one part in $10^5$ would be needed to select anyone of the $10^8$ bits in a single tube. Such accuracy in the deflecting circuitry (if attainable) would be extremely complicated, expensive and slow.

From the foregoing description of the fly's eye, compound lens arrangement, electron-optic system shown in FIG. 2 it will be appreciated that an electron beam write/read apparatus is made available which is capable of reliably and reproducibly accessing to any desired bit site having a size of one micron within a unique field of view of $10^5$ bit sites for each of $10^3$ lenslets. A more detailed description of the construction and operation of the electron-optic system will be set forth hereinafter in connection with FIGS. 8 and 9 of the drawings. However, the foregoing description of the preferred electron write/read apparatus to be used in practicing the invention, is believed adequate at this point to give the reader a sufficient grasp of the manner in which reading and writing out on each of the individual $10^8$ bit sites in a given memory tube will be accomplished.

Ferroelectric Memory Material

The ferroelectric material selected to form the memory medium should be a polycrystalline film approximately 1,000 A in thickness. A polycrystalline film is preferred since it will reduce bit interaction by inhibiting domain wall motion and hence allow greater packing density for the bits. The thickness of the film also is dictated by the desire to obtain high packing densities along with high writing and read-out speeds. As will become more apparent hereinafter, to obtain the desired high writing and read-out speeds, the thickness of the ferroelectric recording medium film should be about 1/10th the bit diameter that is about 1/10th of a micron or 1,000 A.

One of the better known ferroelectric materials barium titanate ($BaTiO_3$) has a complex crystallographic structure of the perovskite family and, if not carefully processed, departures from stoichiometry may be produced in thin films of this material which will cause variations from anticipated behavior. One known method of forming thin films of $BaTiO_3$ is by a simple evaporation of $BaTiO_3$ from a hot tungsten filament preceded by standard vacuum-deposition practice as described in the textbook "Vacuum Deposition of Thin Films" by L. Holland, published by J. Wylie New York 1958. With this practice a gross stoichimetry problem may develop because the $BaTiO_3$ decomposes into BaO and $TiO_2$. This is due to the higher vapor pressure of the BaO causing it to evaporate first, thus producing a double-layered film of incompletely reacted material. Subsequent annealing can induce further reaction of the two components but complete stoichimetry still may not be achieved. Estimates indicate that low values of polarization and high dielectric loss (with consequent loss of desirable signal producing characteristics to be discussed hereafter) could result from incompletely reacted BaO and $TiO_2$.

Another known method of ferroelectric film fabrication is identifed as "flash evaporation". This method, which was originally developed for the vacuum deposition of alloys whose constituents had greatly different vapor pressures, is based on the simple idea of sequentially dropping small pellets of the material in question on a hot metal ribbon. Each pellet is quickly evaporated (flashed) upon hitting the ribbon and is deposited on the growing film, and since the pellets mass is small, each pellet adds only a small (a few A units) to the film thickness. Any local departure from stoichiometry therefor is almost instantaneously corrected by diffusion processes. Ferroelectric films fabricated in this manner have been described in a number of publications such as an article by A. Moll, in A. Angew Physik, Vol. 10, Pg. 410 (1958) and the article by E.K. Muller, B.J. Nicholson and G. L. E. Turner appearing in the Journal of Electro-Chemical Society, Vol. 110, Pg. 969 (1963). Ferroelectric films deposited in this manner do not exhibit gross non-stoichiometry characteristics. Both of the techniques described above, while giving the correct ratio of metal ions, tend to produce films lacking in oxygen. To overcome the oxygen deficiency, films fabricated in this manner are commonly annealed in oxygen after deposition or better yet, deposited at a high substrate temperature in a high partial pressure of oxygen.

Another known vacuum-deposition technique for producing films of excellent stoichiometry is "sputtering". In this technique the material to be deposited is fabricated in the form of a flat plate known as the "target". A plasma of ionized gas is produced above the target, which is maintained at a negative potential relative to the plasma so that the positive gas ions from the plasma are attracted to the "target". These heavy ions have enough momentum to knock ("sputter") molecules out of the target. A suitable substrate positioned near the "target" collects these "sputtered" molecules so that a film gradually is built up on the substrate.

In the past most "sputtering" depositions have involved metal films so that direct current sputtering could readily be achieved by applying a negative potential to the "target" (cathode) and a positive potential to the support or other member (anode) carrying the substrate. At a sufficiently high gas pressure and potential, an arc is stuck and the required plasma is produced. This technique, while highly desirable from the viewpoint of stoichiometry, at first glance would appear to be unsuitable for ferroelectric films because ferroelectrics are insulators. That is, a ferroelectric target could not maintain the required negative potential to attract deposited gas ions. One way of overcoming this difficulty takes advantage of the fact that the electrical conductivity of barium titanate increases with temperature. Accordingly, when the target gets hot during sputtering, its required negative potential can in fact be maintained. Such a technique has been described by P.A.B. Toombs in the proceeding of the British Ceramic Society, Vol. 10, Pg. 237 (1968).

A more general and satisfactory method for sputtering insulating materials is that known as "radio-frequency sputtering". This technique has been described in a publication by P.D. Davidse in Vacuum Vol. 17, Pg. 139, (1967) and by R. Vu HuyDat and C. Bumberger in Phys. Stat. Col. Vol. 22, D67 (1967). In this technique radio-frequency (above 10 kilohertz) signals are applied to the "target" so that necessary plasma is created in the surrounding gas. The surface of the "target" automatically acquires the desired negative potential because, even though each half cycle of radio frequency is equally long, the electrons in the plasma have a higher mobility than the positive ions. This technique has been used in successfully "sputtering" a wide range of dielectric materials including barium titanate. To insure complete reaction of the constituents of the "sputtered" film "radio frequency sputtering" in a partial pressure of oxygen can be used as an added measure for assuring stoichiometry with respect to oxygen.

Another desirable characteristic of the "radio-frequency sputtering" technique is that it produces high polarization (P), relatively stress-free films. The need to achieve high polarization (P) and relatively stress-free film will be discussed more fully hereinafter. The reason that such films are obtained by the "radio frequency sputtering" technique, is that unlike vacuum evaporation (in which a high substrate temperature is needed to assure sufficient mobility of the incoming atoms to result in a film possessing stoichiometry), "radio-frequency sputtering" relies on the high kinetic energy of the atoms to provide the required activating energy. Since the substrate can be kept cold in the "radio-frequency sputtering" process, the temperature difference of the substrate at the time of deposition and at ambient can be kept small and resulting strain (which reduces the value of polarization P), can be greatly reduced or eliminated.

Stability Of Ferroelectric Film Recording Medium

The use of ferroelectric materials as stable memory elements employing a coincident (high potential) voltage matrix selection technique is old and well known in the art as evidenced by such publications as the article by J.R. Anderson entitled "Ferroelectric Storage Elements For Digital Computers and Switching Systems" appearing in Electrical Engineering Magazine, Vol. 71, Pg. 916 (1952). Among the difficulties which impeded widespread adoption of this technique in computer memories was the fact that the ferroelectric materials employed as the recording mediums showed time instability effects. These time instability effects were due primarily to the fact that the polarization (P) slowly decreased or aged with time and, due to the lack of a true coercive force in ferroelectric materials, repeated small movements of domain walls were found to culminate in destruction of information (disturb effect) over a period of time.

It must be emphasized at this point that the present "Curie point writing" method described herein, is based on an entirely different mechanism than these earlier known ferroelectric memories. The only feature that both schemes have in common is their employment of a ferroelectric storage medium.

It must be further emphasized that the old, known, coincident-voltage ferroelectric memories achieve polarization reversal in the ferroelectric recording medium, through the use of high coercive forces, induced by the application of high potential electric fields across the ferroelectric storage medium. As set forth in detail above, the present electron-beam accessed memory employs "Curie point writing" where a discrete area of the ferroelectric storage medium is selectively heated to a temperature in the neighborhood of the Curie point of the ferroelectric material (preferably in excess of the Curie point), and then the selectively heated discrete area is allowed to cool below the Curie point in the presence of a low voltage polarizing potential. During reading, the previously polarized discrete areas forming information bit sites are again selectively heated by redirecting the electron-beam to the sites and heating them to a temperature above ambient but below the Curie point whereby a "-pyroelectric current" output signal is derived non-destructively. No electric field is required during reading.

The important thing to note is that no electric fields are applied to the ferroelectric storage medium during reading, and during writing only a low voltage polarizing potential is applied to the entire ensemble of bits in the memory in order to chose the desired polarization direction for that discrete bit site being selectively heated by the electron beam. However, this polarizing field is negligibly small compared with the large switching potential (on the order of 100–200 volts) used in the known, coincident-voltage ferroelectric memories. Only a low voltage polarizing potential is required due to the fact that the coercive force required to polarize a ferroelectric material decreases with increasing temperature. As a consequence, any small changes in polarization caused by ageing or disturb phenomena are far more tolerable in the "Curie point writing" with an electron beam in the presence of a low voltage polarizing potential compared to the ageing and disturb effects encountered in the old ferroelectric memory utilizing coincident-voltage selection with large polarizing potentials. Another advantageous feature of the proposed "Curie point writing" scheme is that dielectric breakdown is not a serious consideration again due to the fact that only very low potential fields are required for polarization reversal during writing because the coercive force required for polarization reversal decreases with increasing temperature. Such is not true of the known coincident-voltage writing techniques where, because the large stress due to the required high polarizing potentials, dielectric breakdown is a common cause of failure.

Any ageing or disturb effects (even though believed negligible) which might cause concern in certain applications, can be minimized, if desired, in the instant writing method by the simple expedient of applying a pair of pulses of opposing polarity during the writing operation. If a first low voltage polarizing pulse is applied while the bit to be written is at a temperature above the Curie point (ie during the heating phase of the writing operation) it cannot affect the direction of the written-in bit being heated by the electron beam. The polarization of the written-in-bit is determined only by a second polarizing pulse which is applied during cooling below the Curie point and after removal of the writing electron beam. As a consequence, the non-selected bit sites experience two pulses of opposing polarity during the heating and cooling phase, respectively, of each writing operation thereby canceling out ageing or disturb effects.

Curie Point

The Curie temperature ($T_c$) of the ferroelectric recording material should be above room temperature in order to avoid any necessity to cool the memory. With regard to the other extreme, $T_c$ should not be so high that excessive requirements are imposed on the electron beam in order to generate the necessary temperature increment. Furthermore, thermal diffusion causing crystalline growth or other deleterious effects in the memory film which could result from a too high value of $T_c$, must be avoided. These considerations lead to the specification of a Curie temperature of approximately 100° to 120°C. Many ferroelectric materials are known which have a $T_c$ in this range such as the well known barium titanate having a $T_c$ equal to 120°C.

Uniformity

The uniformity requirements for the ferroelectric recording film are not too severe but some attention must be paid to producing films which are relatively free from pin holes and/or chemical inhomogenieties. Preferably the crystallite size should be kept as small as possible compared to the bit site diameters.

Metal Film

Following production of the ferroelectric film in any of the above-described manners, thin metal films, preferably of aluminum, are formed over each of the broad faces by conventional vacuum deposition techniques.

Polarization

A high value of polarization (P) is desired in order to obtain a satisfactory read-out signal and at the same time have as many bits as possible share a common, output sense amplifier. This is important since the total system cost will be greatly influenced by the number of sense amplifiers required to read-out the total number of bits stored.

A measure of the energy (W) obtained from each bit site during "pyroelectric current" read out as described above, is provided by the following expression:

$$W = \tfrac{1}{2}(2P^2A/C) \qquad (1)$$

where $C$ is the electrical capacity of the memory array, $A$ is the area of the bit site and $P$ is the polarization. Since the capacity $C$ is proportional to the area of the memory, it follows immediately that the read-out energy is inversely proportional to the number of bits in the memory. It is to be further noted that a minimum read-out energy is required in order to overcome thermal noise in the sense amplifier, so that for a given value of $P$ there is a maximum number of bits which can share a single output sense amplifier. From equation (1) it further follows that the number of shared bits increases with the square of the polarization $P$. Hence, it is clear that an important system dividend is obtained by increasing the value of the polarization $P$.

The above point is so central that further elaboration is required. Assume that $n$ bits are closely packed over the ferroelectric film and that all n bits feed the same sense amplifier. Further, assume the ferroelectric to be of thickness $d$, and (for simplicity) the bit to be a square of length D on a side. If K is the dielectric constant of the ferroelectric film, and $\epsilon_0$ the permativity of free space, the capacitance $C$ seen by the sense amplifier is in MKS units:

$$C = (nD^2K\epsilon_0)/d \qquad (2)$$

Supposing that a single bit is selected by the electron beam for interrogation, and that because of the heating caused by the electron beam, the polarization of the bit changes by the amount $\Delta P$. Then the total charge which flows from one electrode of the metal-ferroelectric-metal sandwich to the other electrode is given by $q = D^2\Delta P$. This charge is detected by the sense amplifier and, since the polarity of the charge indicates the binary state of the bit, the signal is passed onto the rest of the computer system.

The energy read out of the bit, from simple capacitor theory, is:

$$E = q^2/2C \qquad (3)$$

Substituting equation (2) into equation (3) results in:

$$E = (D^2(\Delta P)^2d)/(2nK\epsilon_0) \qquad (4)$$

If t is the read out time, the average signal power $P_s$ is given by:

$$P_s = [(\Delta P)^2dD^2]/(2nK\epsilon_0t) \qquad (5)$$

On the other hand, the average noise power $P_n$ may be approximated by:

$$P_n = kT/t \qquad (6)$$

Where $k$ is Boltzmann's constant and $T$ is the temperature of the sensing (load) resistor. Assuming that $P_s/P_n = 100$, so that the signal-to-noise ratio of the voltage amplitude is 10, then from equations (5) and (6)

$$n = [(\Delta P)^2dD^2]/(200K\epsilon_0kT) \qquad (7)$$

From a consideration of equation (7), it will be seen that the number of bits ($n$) which can share a single output sense amplifier for a given bit size, is proportional to the square of $\Delta P$ The value of $\Delta P$ in turn is dependent primarily upon the value of $P$ if electron beam current and access time are to be held to a minimum. Hence, considerable system dividends are derived by employing ferroelectric films having a high value of $P$.

Several methods for preparing fine particles of ferroelectric materials are known such as coating the powder on a suitable substrate by electrophoresis, spraying from solution, chemical precipitation, etc. However, such techniques are generally not applicable for the present purpose because they cannot produce sufficiently fine-grain films in the 1,000 angstrom thickness range. Single crystal films of this thickness have been made by chemically etching bulk specimens but generally films of only small lateral extent (tens of microns) can be so obtained. The best manner of preparing ferroelectric films for use as recording mediums in the present method and apparatus, and which possess the desired characteristics of fine grain and high polarization ($P$), generally will involve utilization of standard vacuum deposition techniques, and preferably the "radio-frequency sputtering" technique described earlier. In fabricating ferroelectric film recording mediums by any of these techniques, detailed control and attention must be given to the deposition conditions, the preparation and nature of the substrate, the electrodes and substrates used, the effects of strain and departures from stoichiometry. While barium titanate has been described as a suitable ferroelectric material for use in fabricating the thin ferroelectric films, other known ferroelectric materials that could be employed in forming the desired ferroelectric thin films are — $PbTa_2O_6$; $Pb_{0.99}[(Zr_{0.50}Sn_{8.5})_{0.86}Ti_{0.14}]_{0.98}Nb_{0.02}O_{30.60}Ba_{0.40}Nb_2O_6$; $Pb_{0.45}Ba_{0.10}Sr_{0.45}Nb_2O_6$; $Pb(Ti{\cdot}Zr{\cdot}Sn)O_3$ and $Sr_{0.7}Ba_{0.3}Nb_2O_6$.

If read-out is accomplished by the "pyroelectric current" technique described above the frequency response of the memory element is determined by the condition:

$$f = k/D^2.$$

Where $k$ equals the thermal diffusivity of the substrate on which the ferroelectric film is formed and $D$ equals the diameter of the bit. (It should be noted that in the preceeding discussion reference to a ferroelectric film by implication also includes a suitable substrate where such is required by the particular fabrication technique employed). For a sapphire substrate and with $D$ equal approximately 1 micron, a frequency response of $f$ = 500 MHz is obtained. It will be appreciated therefor that the proposed memory employing such a recording medium can be operated at a high enough frequency for almost any contemplated computer memory system. However, in practice, a substrate having a much lesser value of $k$ generally is chosen in order to obtain sufficiently large temperature excursions with currently available electron-beam sources. For example, a practical substrate at the present time would be glass resulting in a read out frequency $q$ of about 1 megacycle corresponding to the one bit per microsecond access time. For many applications it may be highly desirable to read at higher frequencies and the present system can be readily adapted for such use depending upon the electron beam current available and the bit diameter as explained above. Further, in the following paragraphs a recording medium and method for reading a ferroelectric memory at frequencies up to about 100 megacycles through an adaptation of the system using a semiconductor depletion layer as an electron detector, is described.

Metal-Ferroelectric-Semiconductor-Metal Recording Medium and Depletion Layer Read Out Method And Apparatus The state of charge of a bit site on a ferroelectric memory film can be used to modulate the space-charge region in the surface of an adjacent semiconductor layer that interfaces with the ferroelectric film. FIG. 3 of the drawings is a partial sectional view of a metal-ferroelectric film-semiconductor-metal memory sandwich constructed in accordance with the invention and suitable for use in practicing depletion-layer read out of a ferroelectric memory film. The sandwich is comprised by a metal layer 12 such as an aluminum film deposited over a ferroelectric film 11 which in turn is formed over the surface of a semiconductor substrate 31 to define an interface 32. A metal layer 13 may comprise another layer of aluminum is then formed over the remaining surface of the semiconductor substrate 31. Suitable polarizing potentials are supplied to the memory sandwich from low voltage battery sources 16 or 17 through switch contact 18 during writing. During read out the load resistor 19 is connected across the metal layers 12 and 13 by switch contact (ie to derive output signals that are amplified by the output sense amplifier 21, and then supplied to the computer. During writing, the electron beam 14 is caused to impinge upon the discrete areas 11a, 11b, etc, of the ferroelectric film 11 to be selectively heated in conjunction with the application of a suitable polarity polarizing potential from the source 16 or 17, dependent upon the nature of the bit to be written i.e., either a 0 or a 1). Assuming the convention previously adopted, then a downwardly polarized discrete area such as 11*a*, 11*c*, and 11*d* represents a binary "1" and an upwardly polarized area such as 11*b* represents a binary "0". The presence of positive polarity charges adjacent the interface 32 with the semiconductor layer 31 causes a space-charge region of one character to be formed in the semiconductor layer at discrete areas (bit sites) such as 11 *a*, 11*c*, and 11*d*. The presence of negative polarity charges in the ferroelectric film 11 adjacent the interface 32 causes a space-charge region of opposite character to be formed in the semiconductor layer 31 at discrete areas such as 11*b*.

Figure 4:
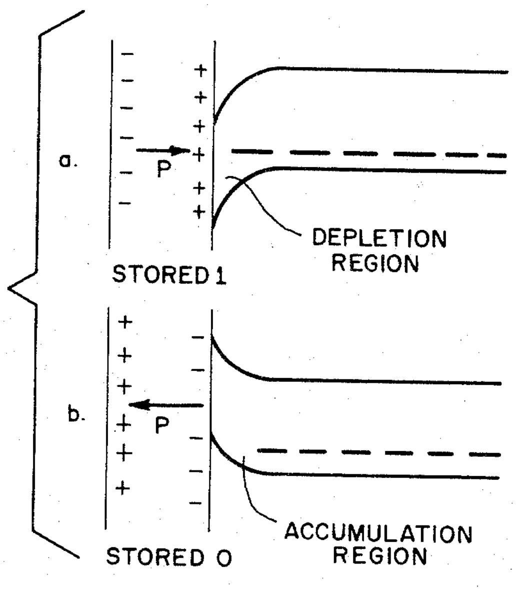
FIGS. 4 and 5 are abbreviated space-charge diagrams illustrating the manner in which information is recorded on the storage medium shown in FIG. 3.

If the semiconductor layer 31 is a P-type semiconductor then the charges stored in the discrete areas or bit sites 11*a*, 11*b*, etc will affect the energy bands in the semiconductor layers in the manner shown in FIG. 4 of the drawings. In discrete areas such as 11*a*, 11*c* and 11*d*, where a plus (+) charge is adjacent the interface 32, the energy bands of the semiconductor layer will be bent downwardly to form a depletion region as shown in FIG. 4*a*. Where negative charge representative of a binary "0", is adjacent the interface 32, the energy bands of the semiconductor layer will be bent upwardly in the manner shown in FIG. 4*b* of the drawings and an accumulation region will be formed. During read out, the energy level of the reading electron beam 14 is adjusted to cause the electron beam to probe the space charge region of the semiconductor layer 31. At points where the reading electron beam penetrates a depletion region, large signal currents will be produced. Where the reading electron beam penetrates into an accumulation region, only very small signal currents will be developed. For a more detailed description of this read-out technique, reference is made to co-pending U. S. application Ser. No. 1,755 entitled "Slow Write-Fast Read Memory Method and System"—D.O. Smith, K.J. Harte and M.S. Cohen, inventors, filed Jan. 9, 1970 and assigned to Micro-Bit Corporation.

Figure 5:
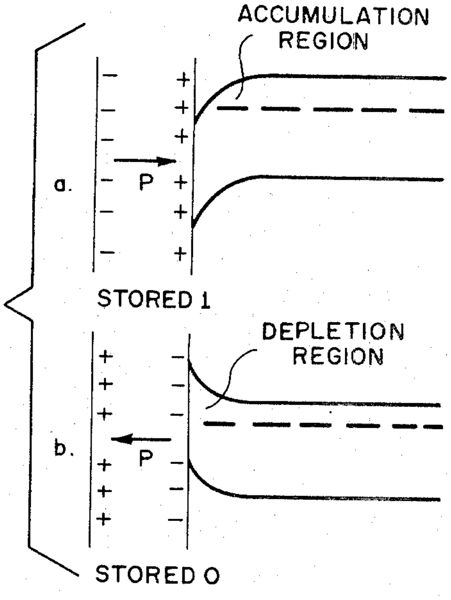

FIG. 5 of the drawings is a space-charge diagram indicating the effect on an N-type semiconductor layer of the polarized charges formed in the ferroelectric film 11. In an N-type semiconductor layer the presence of positive charges adjacent the interface 32 as shown at the discrete areas 11*a*, 11*c*, and 11*d*, causes a downward bending of the energy bands of the semiconductor layer, and produces an accumulation region as illustrated in FIG. 5*a* of the drawings. In discrete areas such as 11*b* where negative charges are located adjacent the interface 32, an upward bending of the energy bands of the semiconductor layer is produced and results in a depletion region being formed in the layer.

Figure 6:
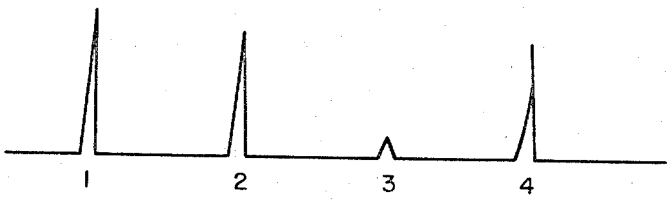
FIGS. 6 and 7 are voltage vs time characteristic curves illustrating the nature of the signals obtained during read out of information patterns stored in the manner shown in FIGS. 4 and 5, respectively.
Figure 7:
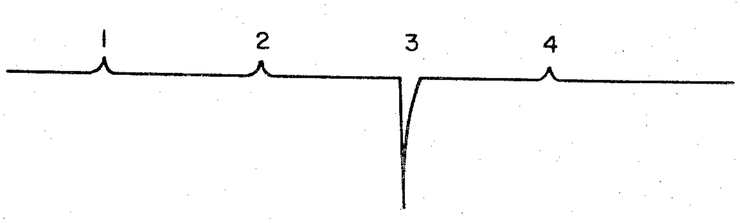

It will be seen from a comparison of FIGS. 4 and 5 that the effect of different polarity stored charges on the semiconductor layer is exactly opposite. Hence, in bit site discrete areas where a binary "1" (downwardly polarized) charge is formed having positive charges adjacent the semiconductor interface, a depletion region is formed in P-type semiconductors causing a large read out current and an accumulation region is formed in N-type semiconductors producing a small read-out current during the read operation. A similar reversal in the nature of the output signal currents produced for stored binary "0" also occurs in P and N-type semiconductors. It will be seen therefore that if the semiconductor layer 31 is assumed to be a P-type semiconductor, then the electron beam in scanning from right to left sequentially over the discrete areas (bit sites) 11*d*, 11*c*, 11*b* and 11*a* in that order, would product output signals having a characteristic wave form shown in FIG. 6 of the drawings. Conversely, if the semiconductor layer were an N-type semiconductor, a similar scanning of the read out electron beam 14 would produce output signals having the wave form shown in FIG. 7 of the drawings. With either type semiconductor layer, a considerably amplified output signal is obtained by reason of the built-in-gain achieved as a result of probing the depletion regions representative of information bit sites. Read-out occurs almost instantaneously with impingement of the read out electron beam on the bit site. It is not necessary that the reading electron beam dwell at a particular bit site sufficiently long to heat that bit site to some increased temperature $\Delta T$ sufficient to produce the "pyroelectric current" effect. Consequently, read out at much higher rates on the order of 100 megacycles and possibly higher can be achieved.

Figure 8:
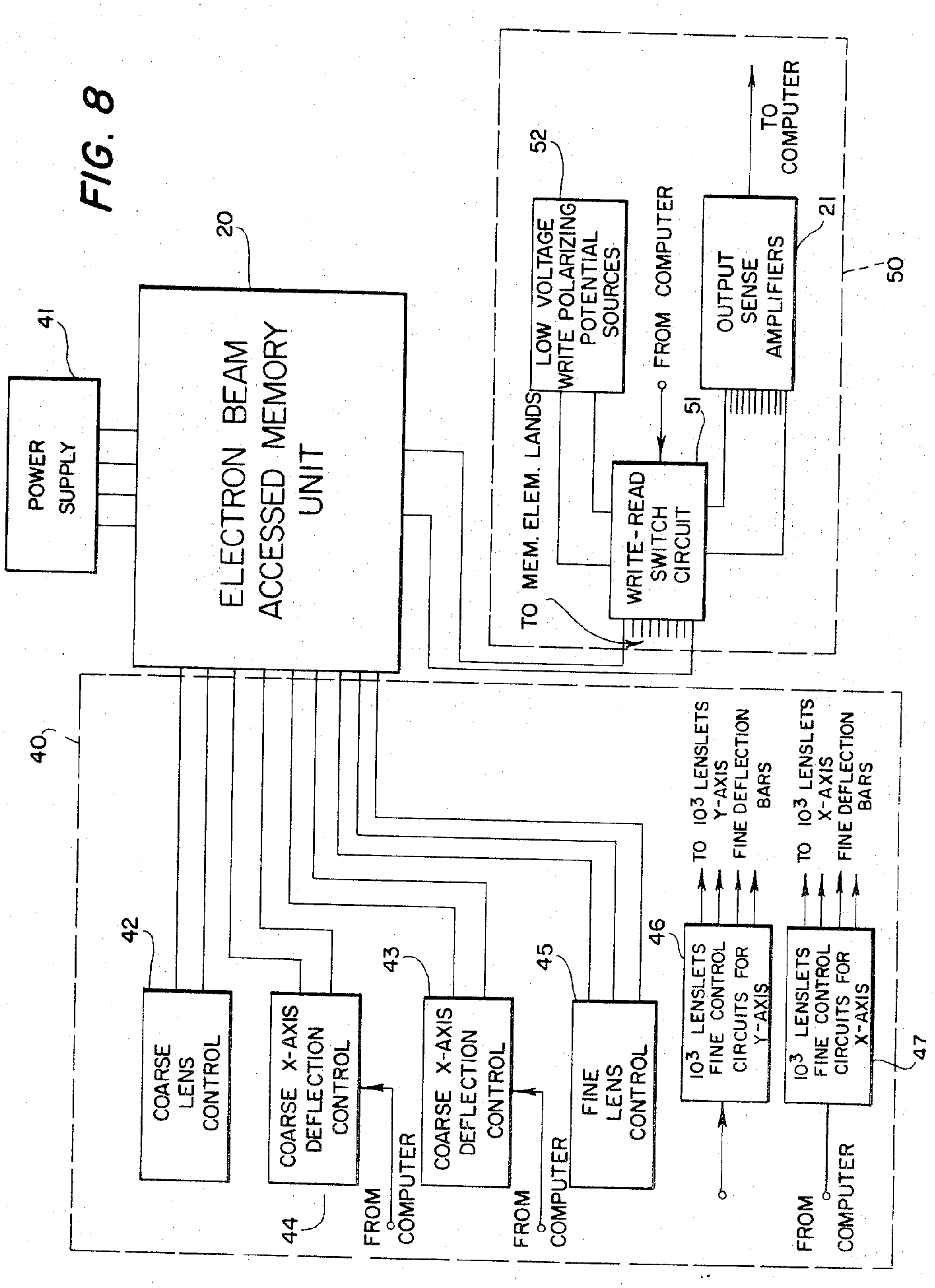
FIG. 8 is a schematic block diagram of a high speed, large storage capacity, electron beam accessed memory constructed in accordance with the invention.
Figure 8A:
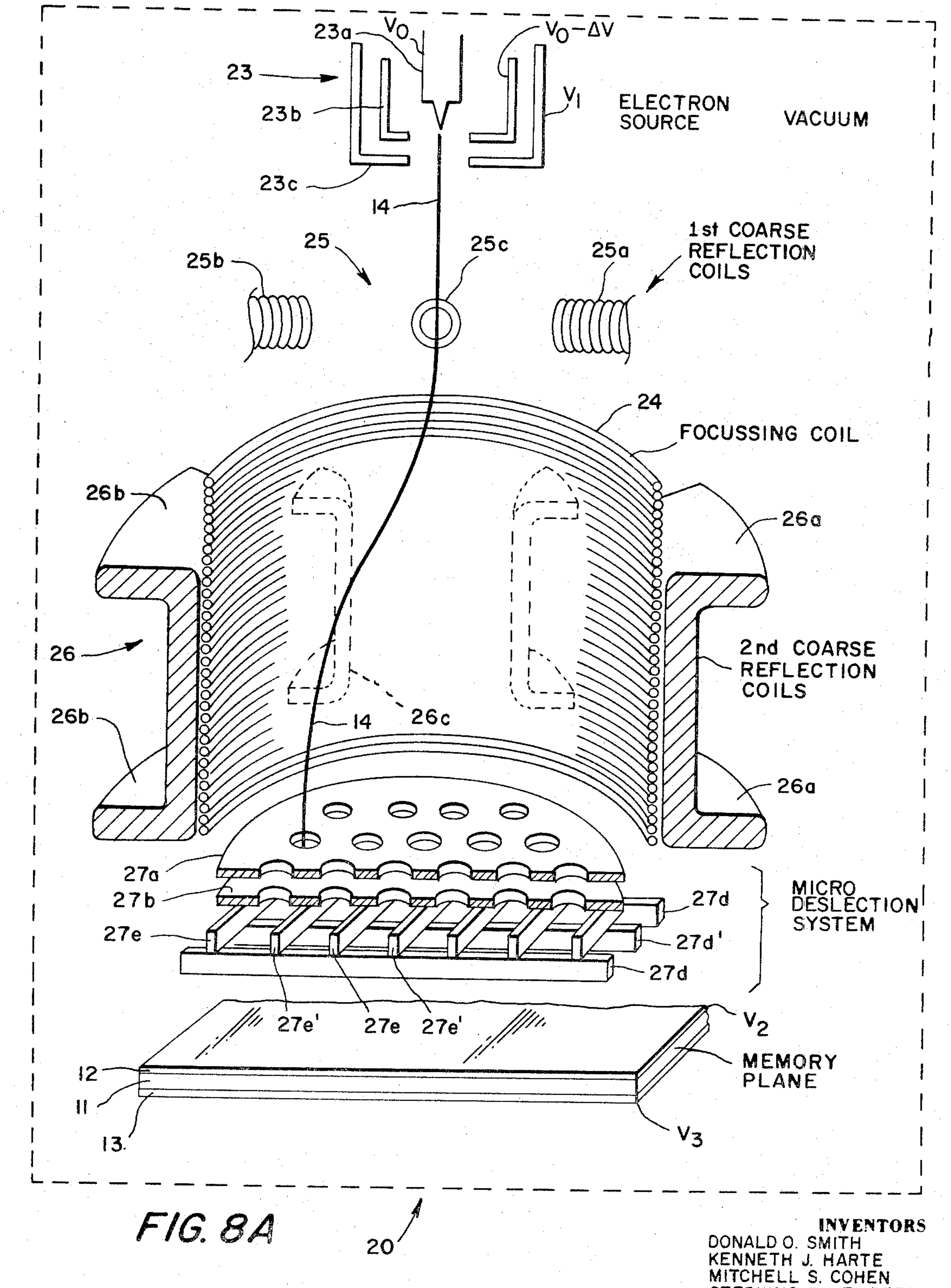
FIG. 8A is sectional view of an electron beam accessed memory unit according to the invention employing a dual electromagnetic coarse deflection lens arrangement in conjunction with a micro-deflection assembly and suitable for use in the memory system of FIG. 8.
Figures 8B, 9:
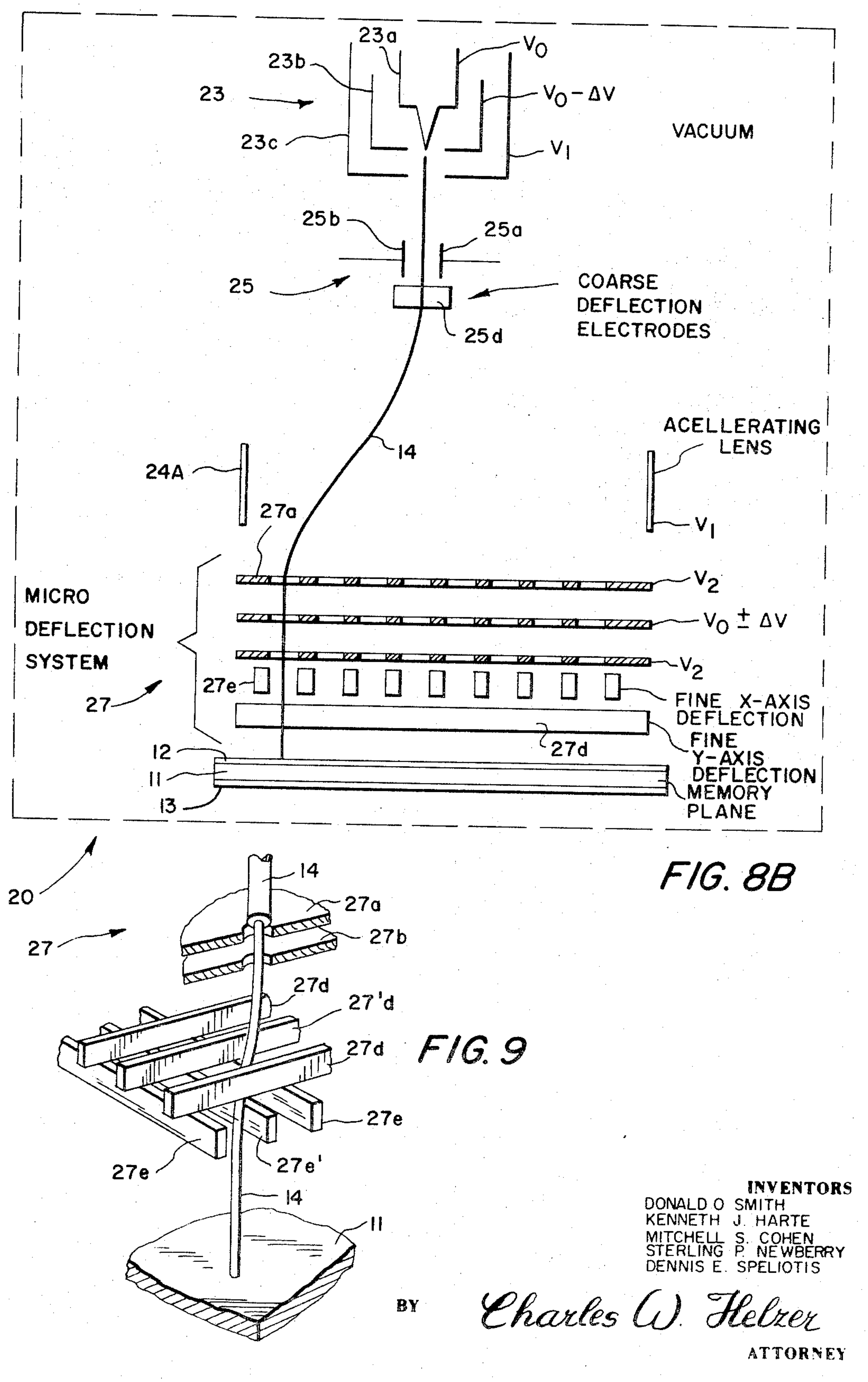
FIG. 8B is a sectional view of an electron beam accessed memory unit according to the invention employing a single electrostatic coarse deflection lens and accelerating lens arrangement in conjunction with a micro-deflection assembly and also suitable for use in the memory system of FIG. 8.
FIG. 9 is a partially disassembled, perspective view of the construction of the fine focusing and deflection lenslets comprising the micro deflection assembly employed in the electron beam accessed memory unit of FIG. 8 and 8A.

High Speed Electron Beam Write/Read Apparatus Employing Compound Fly's Eye Lens Electron-Optic System FIG. 8 is a schematic block diagram illustrating the construction of one form of electron beam write/read apparatus for randomly accessing a large number of information bit storage sites on a ferroelectric recording medium and is to be considered in conjunction with the Electron Beam Accessed Memory Units shown in either FIG. 8A or FIG. 8B of the drawings. The electron beam accessed memory unit shown in FIG. 8A is comprised by an evacuated glass envelope indicated by dotted lines 20 enclosing an electron source 23 which includes an electron emitting surface or cathode 23*a*, first accelerating grid 23*b* and an apertured accelerating anode 23*c* all supplied from a suitable power supply source such as 4 shown in FIG. 8. The electron source 23 produces an electron beam 14 and projects it into the field of a first set of coarse deflecting coils 25 including oppositely placed coating coils 25*a* and 25*b* for deflecting the electron beam 14 in X-axis and orthoginally placed coils 25*c* and 25*d* (not shown) for deflecting the electron beam along the Y-axis. The electron beam also is acted upon by a coarse focusing lens 24 supplied from a coarse lens control power supply 42 shown in FIG. 8 within the field of focusing lens 24, the electron beam 14 also is acted on by the combined fields of a second set of opposed coarse deflection coils 26*a*, 26*b*, 26*c* and 26*d* (26*d* is not shown), which cause the electron beam 14 to be deflected to a desired one of $10^3$ lenslets included in the micro deflection system shown generally at 27. The second set of deflection coils 26*a* and 26*b* serve to deflect the electron beam 14 along the X-axis and are supplied with suitable coarse X-axis deflection control signals from a coarse X-axis deflection control circuit 43 shown in FIG. 8. Coarse control circuit 43 includes suitable digital to analog conversion circuitry which interfaces with the remainder of the computer system with which the memory is used and operates to convert digital instructions from the computer input-output equipment into suitable analog signals from controlling operation of the X-axis deflection coils 25*a*, 25*b*, 26*a* and 26*b*. Similarly, the Y-axis deflection coils 25*c*, 25*d* (not shown), 26*c* and 26*d* (not shown) are supplied with suitable control signals from a coarse Y-axis deflection control circuit 24 that likewise includes suitable digital to analog conversion circuitry for interfacing with the computer system and controling operation of the Y-axis coarse deflection coils.

All of the $10^3$ lenslets in the micro deflection system are similar construction and operation and are arrayed in a common plane transverse to the electron beam 14.

The construction of one of the $10^3$ lenslets comprising the micro-deflection system 27 is shown in greater detail in FIG. 9 of the drawings and illustrates a series of two fine electron lens 27*a* and 27*b* which are supplied with suitable control potentials from a fine lens control circuit 45 shown in FIG. 8. The two fine electron lens 27*a* and 27*b* comprise a series of simple Einzel lenses formed by two apertures on a common axis in two separate metal sheets stacked one over the other. All of the apertures of the lenslets 27*a* are contained in a common metallic plane sheet which is maintained at a potential approaching the potential of the accelerating anode 23 of the electron beam source 23. In a similar manner, the fine lenslet apertures 27*b* are contained in a common outer metallic plane and this outer metallic plane is maintained at an anode potential $V_2$ which is greater than $V_1$. Thus, for the complete matrix of $10^3$ lenslets only two leads are required from the fine lens control 45, one for each plane of apertures such as 27*a* and 27*b*. The fact that all lenslets are connected at the same time does not interfere with the operation of the micro deflection system, since only that lenslet or lenslets to which an electron beam is directed, will be activated. Thus, if a common electron source is employed with a coarse deflection system as shown in FIG. 8A, it can be used as an electrical switch to activate any desired one of the $10^3$ lenslets by suitable command signals supplied from the computer through control circuits 43 and 44 to the coarse X-axis and Y-axis deflection coils 25 and 26.

Immediately below each set of fine focusing lens apertures 27*a* and 27*b* a set of fine X and Y-deflection-plates are positioned. The fine X and Y deflection plates are formed by co-acting sets of parallel, continuous, deflecting bars with one set of bars 27*d* forming the Y deflection plates and the remaining set of bars 27*e* forming the X deflection plates. The set of Y deflection bars are electrically isolated from the set of X deflection bars. Each of the parallel, Y axis fine deflection bars 27*d* would comprise one of the teeth of comb-like structure and the bar 27*d'* *would constitute one of the teeth of a second comb-like structure electrically isolated from the first comb-like structure. Similarly, the parallel X-axis deflection bars 27e* and 27*e'* comprise two interdigited teeth of a set of two comb-like structures. Hence, as in the case of the lens plates, only a few connecting leads are required to supply suitable deflection voltages to the fine X and Y-axis deflecting electrodes formed by the spaced-apart, co-acting, interdigited deflecting bars 27*d*, 27*d'* and 27*e*, 27*e'*. Similar to the micro lens structure, it does not matter that deflecting voltages are supplied to all of the teeth of a comb-like structure and that a deflection field exists in every one of the $10^3$ lenslets. Only one of the lenslets will be activated by reason of the electron beam having been addressed to it by the coarse deflection system. Hence the existence of deflecting fields in adjacent lenslets, and the fact that they are reversed, is of no consequence. The upper conductive layer 12 of the ferroelectric memory plate likewise is maintained at the higher potential $V_2$ and the lower conductive layer 13 may be maintained at an even higher potential $V_3$ whereby electron beam 14 will be attracted to and impinge upon selected discrete areas of the memory plane.

The ferroelectric recording medium 11 is positioned immediately below the lower-most set of deflecting bars 27*e*, 27*e'*. As a consequence of this arrangement each of the $10^3$ lenslets will have unique field of view which will encompass on the order of $10^5$ discrete areas or bit sites of about 1 micron diameter in size. For a more detailed description of the construction and operation of the micro lens structure, reference is made to a publication entitled "An electron Optical Technique for Large-Capacity Random-Access Memories" by Sterling P. Newberry appearing in the Proceedings of The Fall Joint Computer Conference of the American Federation of Information Processing Societies published by Spartan Books, Washington, D.C., Vol. 29, Page 717-(1966). Suitable Y-axis, fine deflection control potentials are supplied to the set of interdigited Y deflection bars 27*e*, 27*e'* from a Y-axis fine control circuit 46 in FIG. 8 which interfaces with the computer and includes appropriate digital to analog circuitry for converting access instructions to appropriate analog control signals for application to the Y-axis deflection bars in the micro lens structure. Similarly, a fine X-axis deflecting control circuit 47 supplies suitable deflection control signals to the X-axis deflecting bars 27*d*, 27*d'* *in the micro deflection structure. Also, beam blanking may be employed in a known manner during positioning of the beam as described above either by temporary deflection of the beam to an electron trap or by the application of turn-on/turn-off signals to the control grid in a manner that would be obvious to one skilled in the art.*

Referring back to FIG. 8, the thin metal electrodes formed on the memory element 11 are connected to the input terminals of a suitable write-read gating or switching circuit 51 which serves to connect low voltage write-polarizing potentials of appropriate polarity from a source 52 across the memory element sandwich 11 during writing in accordance with instructions from the computer. Alternatively, during reading the gating circuit 51 serves to connect the metal electrodes of the memory element 11 to the respective inputs of appropriate output sense amplifiers 21 which in turn have their output supplies to the computer system. It will be noted that the write-read switching circuit is indicated to have some 11 input terminals supplied to it for switching appropriate ones of these input terminals to corresponding inputs of the output sense amplifiers 21. Referring back to FIG. 1, it will be seen that the metal-ferroelectric-metal memory sandwich has its upper thin metal film 12 divided into a plurality of electrically isolated lands 12*a*, 12*b* etc by appropriate serrations or gaps formed in the metal film 12. It is anticipated that there will be 10 such individual lands each of which accommodates $10^7$ bit sites or discrete areas for information recording purposes. Each of the lands 12*a*, 12*b* etc is designed to be individually connected to a respective output sense amplifier 21 through the write-read switching circuitry 51 so that only $10^7$ bit sites need to share a single output sense amplifier depending upon the nature of the ferroelectric film recording medium. In the event that the metal-ferroelectric-semiconductor-metal sandwich recording medium is employed, there is sufficient built-in-gain in the semiconductor read-out technique to avoid the necessity for multiple output sense amplifiers. In such an arrangement, only a single output sense amplifier 21 appropriately could be used to read-out all of the $10^8$ bits stored on a single memory sandwich.

An alternative form of electron beam accessed memory unit 20 for use with the apparatus of FIG. 8, is shown in FIG. 8B, and employs a single set of orthogonally acting, electrostatic coarse deflection electrodes in conjunction with an accelerating lens. As shown in FIG. 8B, the electron beam emerging from the electron source 23 first passes between a first set of opposite electrostatic deflection plates 25*a* and 25*b* of conventional construction for deflecting the electron beam in the direction of the X-axis, and a second set of electrostatic deflecting plates 25*c* (not shown) and 25*d* orthogonally positioned with respect to 25*a* and 25*b* for deflecting the electron beam along the Y-axis. Thereafter the electron beam passes into the field and influence of accelerating lens 24A maintained at a potential about equal to the potential of the first accelerating anode 23*c* of electron source 23. The accelerating lens 24A acts on the electrons of beam 14 to accelerate them to a speed sufficient to straighten out their path and obtain orthogonal entry of the electron beam into a selected one of the fly's eye lenslets in the microdeflecting structure 27. Additionally, the accelerating lens 24A will achieve some focusing of the electron beam. Accordingly, it will be appreciated that the single accelerating lens 24A in effect accomplishes essentially the same function as the second set of coarse deflecting coils 26 and focusing coil 24 of the electromagnetic electron beam accessed memory unit shown in FIG. 8A, but does so with a simpler structure.

The microdeflection system 27 employed with the electron beam accessed memory unit of FIG. 8B is similar in construction and operation to the microdeflection assembly shown in FIG. 9 with the exception that it includes an additional focusing lenslet member 27*c*. The additional focusing lenslet member 27*c* is identical in construction to the members 27*a* and 27*b* and includes some $10^3$ aperture openings which are aligned co-axially with the lenslet aperture openings in each of the members 27*a* and 27*b*. In the FIG. 8B arrangement, the inner or central planar metallic sheet member 27*b* is supplied with a focusing potential $V_o \pm \Delta V$ comparable to that of the first accelerating grid 23*b* of the electron gum 23. The two outer planar metallic members 27*a* and 27*c* are supplied with the potential $V_2$ greater than the potential $V_1$ supplied to the accelerating lens and equal to the potential applied to the upper metallic layer 12 of the ferroelectric memory element 11. If desired, an even higher potential $V_3$ may be applied to the lower metallic layer 13. The value of the biasing potential $V_3$ relative to the potential $V_2$ must be adjusted in value so that no undue potential stress is produced across the memory sandwich 11 which adversely influences the proper polarization of the bits being written during a writing operation as described previously or interferes with the read-out operation. This same observation is also applicable to the embodiment of the electron beam accessed memory unit shown in FIG. 8A of the drawings. In all other respects the unit shown in FIG. 8B functions in essentially the same manner as that described in relation to FIG. 8A and FIG. 9 when supplied with operating potentials from control circuitry such as that shown in FIG. 8.

Figure 10:
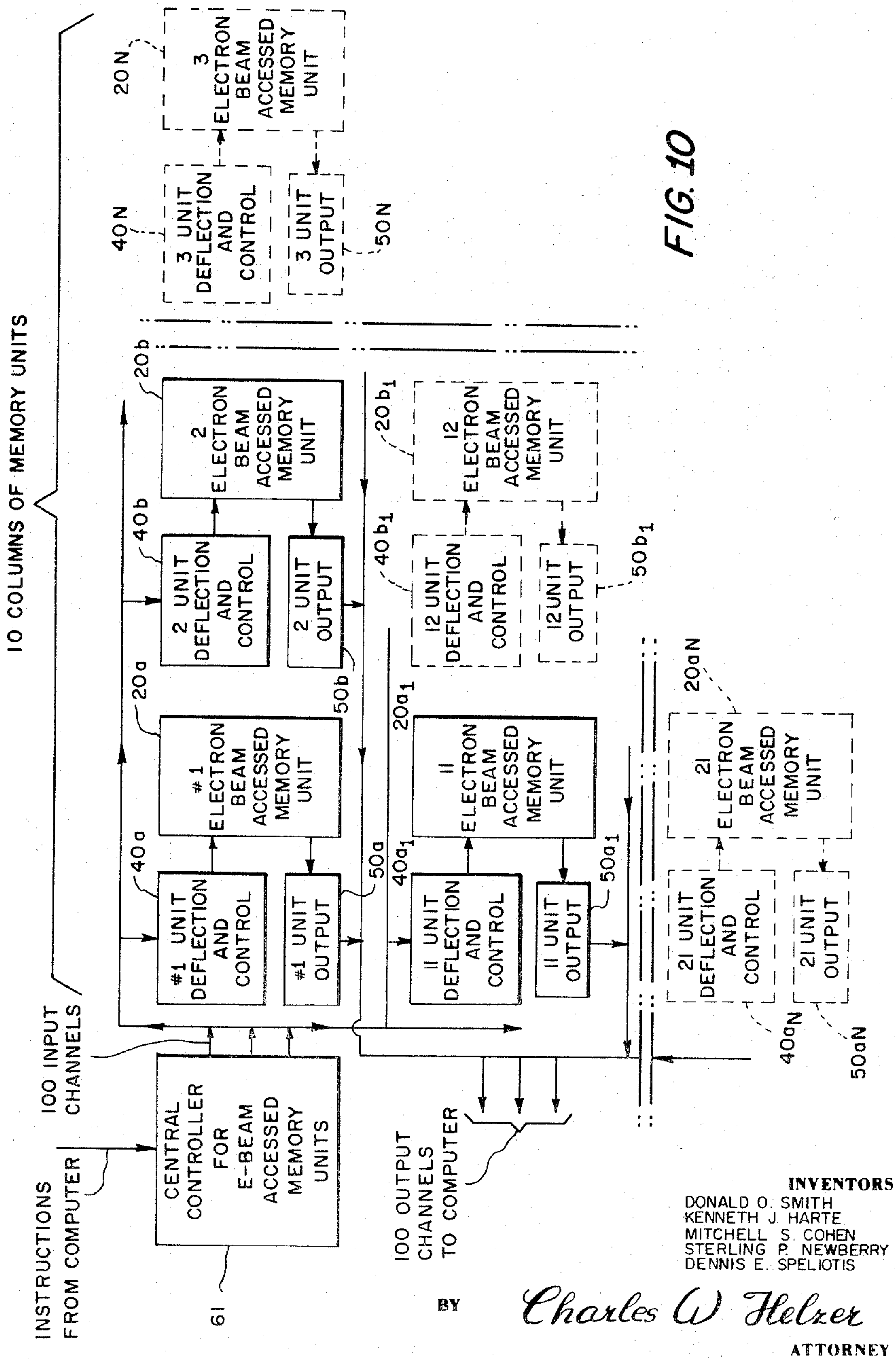
FIG. 10 is a functional block diagram of a 100 parallel channel high speed-large capacity computer memory system typical of the type of memory system that can be constructed in accordance with the invention.

FIG. 10 of the drawings is a functional block diagram of one known form of high speed, large storage capacity ($10^{10}$ bits of information stored) memory system. In the memory system shown in FIG. 10 it will be seen that there are 10 columns of memory units (each constructed in the manner shown in FIGS. 8–9 of the drawings) arrayed with 10 rows of units to form a matrix of 100 or $10^2$ such memory units, corresponding to the bits in a word. As described previously, each of the memory units such as 20*a*, 20*b*, 20*a*$_1$, etc is accessed simultaneously from a central controller in accordance with instructions supplied from the computer. It is believed obvious that for really large capacity memories, this central controller could itself comprise an electron beam accessed memory unit. The instructions from the computer then are supplied to the appropriate unit deflection and control circuits 40*a*, 40*b*, etc corresponding to each of the electron beam accessed memory units. Output signals from each of the electron beam accessed memory units are supplied through the output amplifier units 50*a*, 50*b*, etc back to the computer system with which the memory system is employed. It is believed obvious that while a system of $10^2$ memory units corresponding to $10^2$ bits per word has been illustrated in FIG. 10, either larger or smaller arrays of units could be employed in the system to accommodate a particular installation requirement. Further, it is entirely feasible that the storage capacity of each of the electron beam-accessed memory units can be increased or decreased by appropriate design of the electron beam write/read apparatus and/or available storage area on the ferroelectric storage medium. Hence, considerable design flexibility is possible in order to accommodate the information storage requirements of any particular computer installation.

From the foregoing description, it will be appreciated that the invention provides a family of novel, high speed, large storage capacity, electron beam accessed memory units for use with electronic computers. By appropriate combinations of these high speed, large storage memory units, extremely large memory systems capable of storing on the order of $10^{10}$ bits of information on one micron bit sites and capable of being accessed at speeds of at least one bit per micro-second or higher are made possible. Further, cost projections indicate such systems can be manufactured and sold at prices which will enable information to be stored and/or retrieved from the discrete information sites for a cost on the order of 0.002 cents per bit. In providing such new and improved computer memory systems, the invention has also made available to the art a new and improved method and apparatus for Curie point writing on thin film ferroelectric storage mediums in the presence of low voltage polarizing potentials. The provision of such thin film ferroelectric storage mediums also comprises an important part of the invention.

While the present disclosure has been concerned primarily with high speed, large capacity, electron-beam accessed memory systems, it is believed obvious to one skilled in the art that the recording principles taught herein are applicable broadly to any high speed beam, heat inducing, selective writing means. Thus, lower density storage applications will arise where the extremely fine focusing and deflection capabilities of the electron beam are not required. For such applications, the grosser capabilities of a light beam, laser beam, etc might suffice, in which eventuality the principles of the invention are equally applicable.

Having described several embodiments of a novel, high speed, large storage capacity computer memory system and method of information storage in accordance with the invention, it is believed obvious that other modifications and variations of the invention are possible in the light of the above teachings. It is therefore to be understood that changes may be made in the particular embodiments of the invention described which are within the full intended scope of the invention as described by the appended claims.

What is claimed is:

1. A high speed memory including a ferroelectric storage medium having a thickness less than one micron, high speed, selectively directed electron beam heating means for selectively heating discrete storage areas on the ferroelectric storage medium to a temperature in the vicinity of the Curie point of the ferroelectric storage medium, and means for applying a low voltage polarizing potential of the order of 2 to 6 volts across the ferroelectric storage medium during cooling of the selectively heated discrete storage areas below the Curie point whereby a polarized charge is permanently frozen into each discrete area selectively to form a unique bit of recorded information.

2. A high speed memory according to claim 1 wherein the means for applying a low voltage polarizing potential is selectively reversible whereby different polarity charges may be formed at selected different discrete areas on the ferroelectric storage medium representing binary one and zero information bit sites.

3. A high speed memory according to claim 1 wherein the ferroelectric storage medium comprises a thin ferroelectric film on the order of a few thousand angstroms thick sandwiched between two thin metal films.

4. A high speed memory according to claim 3 wherein the ferroelectric film is formed from the class of materials comprising $BaTiO_3$ and $Pb(Ti{\cdot}Zr{\cdot}Sn)O_3$.

5. A high speed memory according to claim 1 further including means for deriving a reverse polarizing potential having a polarity opposite to that of the charge to be frozen-in a given information bit site at each selected discrete area, and means for applying said reverse polarizing potential across the ferroelectric storage medium during heating up of the selected discrete areas whereby the storage medium is subjected to alternate polarity polarizing potentials during the respective heating and cooling phases of each writing operation to thereby minimize disturbance effects on adjacent information bit site locations.

6. A high speed, large storage capability memory according to claim 1 wherein the electron beam writing apparatus is of the type having a compound arrangement of a matrix of fine lenslets arrayed in a common plane with each lenslet having its own focusing and deflection system for focusing and directing an electron beam onto different discrete areas of the ferroelectric storage medium within an area of view unique to each lenslet, and a coarse focusing and deflection system capable of focusing an electron beam from a suitable source and directing it to a selected fine lenslet for activating that lenslet and selectively recording a bit of information on a discrete area of the ferroelectric recording medium within the unique field of view of the selected lenslet.

7. A high speed memory according to claim 6 wherein the memory is capable of storing $10^8$ bits of information in discrete areas on the order of 1 micron in diameter on the surface of a ferroelectric storage medium approximately one centimeter by 1 centimeter square and with recording speeds of at least one bit per microsecond.

8. A high speed memory according to claim 7 wherein the ferroelectric storage medium comprises a thin ferroelectric film on the order of a few thousand angstroms thick sandwiched between two thin metal films.

9. A high speed memory according to claim 8 wherein the ferroelectric film is formed from the class of materials comprising $BaTiO_3$ and $Pb(Ti{\cdot}Zr{\cdot}Sn)O_3$.

10. A high speed large storage capability memory system having a storage capacity on the order of $10^{10}$ bits randomly accessible at a speed of at least one bit per microsecond wherein there are $10^2$ high speed memory units according to claim 9 arrayed in a common system and having a central common controller for accessing simultaneously each of the high speed memory units in response to instructions from a computer system input-output equipment and an output amplifier circuit connected to the output from each of the high speed memory units for supplying accessed information back to the computer.

11. A high speed memory according to claim 9 further including means for deriving a reverse polarizing potential having a polarity opposite to that of the charge to be frozen-in a given information bit site at each selected discrete area, and means for applying said reverse polarizing potential across the ferroelectric storage medium during heating up of the selected discrete areas whereby the storage medium is subjected to alternate polarity polarizing potentials during the respective heating and cooling phases of each writing operation to thereby minimize disturbance effects on adjacent information bit site locations.

12. A high speed large storage capability memory system wherein there are a multiplicity of high speed memory units according to claim 6 arrayed in a common system and having a central common controller for accessing the high speed memory units.

13. A high speed memory according to claim 6 wherein the electron beam writing apparatus is disposed within an evacuated housing including a source of electrons confronting the ferroelectric storage medium, and the coarse deflecting means comprises a single set of orthogonally acting deflecting elements for deflecting an electron beam from the source along mutually orthogonal axes for directing it to a selected fine lenslet, and wherein the electron beam writing apparatus further includes accelerating lens means positioned intermediate the coarse deflecting means and the matrix of fine lenslets for accelerating the electrons and straightening the beam to thereby cause it to enter the fine lenslets along an essentially orthogonal path relative to the plane of the matrix of fine lenslets.

14. A high speed memory according to claim 1 wherein the ferroelectric storage medium comprises a ferroelectric layer laminated with a semiconductor layer to form an interface whereby the polarized charges selectively written into the discrete areas comprising information bit sites on the ferroelectric layer induce corresponding depletion regions or accumulation regions in the semiconductor layer adjacent the interface dependent upon the polarity of the charges frozen into the ferroelectric layer.

15. A high speed memory according to claim 14 wherein the means for applying a low voltage polarizing potential is selectively reversible whereby different polarity charges may be formed at selected different discrete areas on the ferroelectric storage medium representing binary one and zero information bit sites.

16. A high speed, large storage capability memory according to claim 15 wherein the electron beam writing apparatus is of the type having a compound arrangement of a matrix of fine lenslets arrayed in a common plane with each lenslet having its own focusing and deflection system for focusing and directing an electron beam onto different discrete areas of the ferroelectric storage medium within an area of view unique to each lenslet, and a coarse focusing and deflection system capable of focusing an electron beam from a suitable source and directing it to a selected fine lenslet for activating that lenslet and selectively recording a bit of information on a discrete area of the ferroelectric recording medium within the unique field of view of the selected lenslet.

17. A high speed large storage capability memory system wherein there are a multiplicity of high speed memory units according to claim 16 arrayed in a common system and having a central common controller for simultaneously accessing each of the high speed memory units.

18. A high speed write/read memory according to claim 1 wherein output means are connected across the ferroelectric storage medium for deriving output electric signals from the respective discrete storage areas upon the selectively directed electron beam heating means being redirected back to the selectively heated storage areas in a subsequent reading operation, the output electric signals having a polarity and magnitude representative of the unique bit of information previously recorded in the respective selected discrete areas during a writing operation.

19. A high speed write/read large storage capability memory system wherein there are a multiplicity of high speed memory units according to claim 18 arrayed in a common system and having a central common controller for accessing the high speed memory units.

20. A high speed write/read memory according to claim 1 further including output means connectable across at least the ferroelectric storage medium for deriving output electric signals from the respective discrete storage areas representing prerecorded information bit sites during a subsequent reading operation and means for adjusting the energy level of the selectively directed electron beam heating means to a value such that the respective discrete storage areas being read out are heated only to a temperature value below the Curie point during read-out whereby non-destructive read-out is achieved, and output electric signals having a polarity and magnitude representative of the unique bit of information previously recorded in the respective selected discrete areas, are supplied to the output means.

21. A high speed write/read memory according to claim 20 wherein the electric signals produced during read out are pyroelectric current signals produced as a result of the selective heating during reading of the polarized bit information sites to an increased temperature over ambient but below the Curie point of the ferroelectric storage medium whereby non-destructive read-out of the information previously recorded is accomplished.

22. A high speed write/read memory according to claim 21 wherein the means for applying a low voltage polarizing potential is selectively reversible whereby different polarity charges may be formed at selected different discrete areas on the ferroelectric storage medium representing binary one and zero information bit sites.

23. A high speed write/read, large storage capability memory according to claim 22 wherein the electron beam write/read apparatus is of the type having a compound arrangement of a matrix of fine lenslets arrayed in a common plane with each lenslet having its own focusing and deflection system for focusing and directing an electron beam onto different discrete areas of the ferroelectric storage medium within an area of view unique to each lenslet, and a coarse focusing and deflection system capable of focusing an electron beam from a suitable source and directing it to a selected fine lenslet for activating that lenslet and selectively recording a bit of information on a discrete area of the ferroelectric recording medium within the unique field of view of the selected lenslets.

24. A high speed write/read memory according to claim 23 wherein the memory is capable of storing $10^8$ bits of information in discrete areas on the order of 1 micron in diameter on the surface of a ferroelectric storage medium approximately one centimeter by 1 centimeter square and with recording speeds of at least one bit per microsecond.

25. A high speed write/read memory according to claim 24 wherein the ferroelectric storage medium comprises a thin ferroelectric film on the order of a few thousand angstroms thick sandwiched between two thin metal films.

26. A high speed write/read memory according to claim 25 wherein the ferroelectric film is formed from the class of materials comprising $BaTiO_3$ and $Pb(Ti{\cdot}Zr{\cdot}Sn)O_3$.

27. A high speed large storage capability write/read memory system having a storage capacity on the order of $10^{10}$ bits randomly accessible at a speed of at least one bit per microsecond wherein there are $10^2$ high speed memory units according to claim 26 arrayed in a common system and having a central common controller simultaneously accessing each of the high speed memory units in response to instructions from a computer system input-output equipment.

28. A high speed write/read memory according to claim 26 further including means for deriving a reverse polarizing potential having a polarity opposite to that of the charge to be frozen-in a given information bit site at each selected discrete area, and means for applying said reverse polarizing potential across the ferroelectric storage medium during heating up of the selected discrete areas whereby the storage medium is subjected to alternate polarity polarizing potentials during the respective heating and cooling phases of each writing operation to thereby minimize disturbance effects on adjacent information bit site locations.

29. A high speed write/read memory according to claim 20 wherein the ferroelectric storage medium includes a ferroelectric layer laminated with a semiconductor layer to form an interface and the polarized charges selectively written into the discrete areas comprising bit information sites on the ferroelectric layer induce corresponding depletion regions or accumulation regions in the semiconductor layer adjacent the interface dependent upon the polarity of the charges frozen into the ferroelectric layer and wherein the selectively directed electron beam heating means comprises an electron beam write/read apparatus adjusted to selectively probe the semiconductor layer depletion regions and accumulation regions adjacent the interface with the ferroelectric layer during read-out to derive output electric signals representative of the information stored in the charge pattern formed on the ferroelectric layer.

30. A high speed write/read memory according to claim 29 wherein the means for applying a low voltage polarizing potential is selectively reversible whereby different polarity charges may be formed at selected different discrete areas on the ferroelectric storage medium representing binary one and zero information bit sites.

31. A high speed write/read, large storage capability memory according to claim 30 wherein the electron beam write/read apparatus is of the type having a compound arrangement of a matrix of fine lenslets arrayed in a common plane with each lenslet having its own focusing and deflection system for focusing and directing an electron beam onto different discrete areas of the ferroelectric storage medium within an area of view unique to each lenslet, and a coarse focusing and deflection system capable of focusing an electron beam from a suitable source and directing it to a selected fine lenslet for activating that lenslet and selectively recording a bit of information on a discrete area of the ferroelectric recording medium within the unique field of view of the selected lenslet.

32. A high speed write/read memory according to claim 31 wherein the ferroelectric storage medium comprises a thin ferroelectric film on the order of a few thousand angstrom units thick formed on a semiconductor substrate to define the interface and thin metal films on the order of 500 to 1000 Angstrom units thick formed on the remaining surfaces of the ferroelectric film and the semiconductor substrate.

33. A high speed write/read memory according to claim 32 wherein the memory is capable of storing $10^8$ bits of information in discrete areas on the order of 1 micron in diameter on the surface of a ferroelectric storage medium approximately 1 centimeter by 1 centimeter square and with recording speeds of at least one bit per microsecond.

34. A high speed write/read memory according to claim 33 wherein the ferroelectric film is formed from the class of materials comprising $BaTiO_3$ and $Pb(Ti{\cdot}Zr{\cdot}Sn)O_3$.

35. A high speed write/read large storage capability memory system having a storage capacity on the order of $10^{10}$ bits randomly accessible at a speed of one bit per microsecond wherein there are $10^2$ high speed memory units according to claim 34 arrayed in a common system and having a central common controller for accessing simultaneously each of the high speed memory units in response to instructions from a computer system input-output equipment.

36. A high speed write/read memory according to claim 34 further including means for deriving a reverse polarizing potential having a polarity opposite to that of the charge to be frozen-in a given information bit site at each selected discrete area, and means for applying said reverse polarizing potential across the ferroelectric storage medium during heating up of the selected discrete areas whereby the storage medium is subjected to alternate polarity polarizing potentials during the respective heating and cooling phases of each writing operation to thereby minimize disturbance effects on adjacent information bit site locations.

37. The method of permanently recording information on a ferroelectric storage medium having a thickness less than 1 micron with a selectively directed beam of electrons for heating the medium to a temperature at or above the Curie point of the ferroelectric storage medium and thereafter sequentially applying a low voltage polarizing potential of the order of 2–6 volts across the ferroelectric storage medium during cooling of the selectively heated discrete storage areas below the Curie point whereby a polarized charge is permanently frozen into each discrete area selectively to form a unique bit of recorded information.

38. The method set forth in claim 37 wherein the electron beam probe is finely focused and directed through the combined action of compound serially arranged focusing and deflecting fields whereby large storage capability on the order of $10^8$ bits is achieved on discrete areas of the ferroelectric storage medium with each bit site being on the order of 1 micron in diameter and storage can be accomplished at speeds of at least 1 bit per microsecond.

39. The method set forth in claim 37 further including selectively heating the polarized bit information containing discrete areas on the ferroelectric storage medium with a selectively directed beam of electrons in a subsequent reading operation to an increased temperature below the Curie point to thereby derive pyroelectric current output signals whose polarity and magnitude are representative of the information recorded during a previous writing operation.

40. The method set forth in claim 37 further including reversing the polarity of the low voltage polarizing potential applied during cooling at the different discrete areas whereby different polarity charges are formed at the different selected discrete areas on the ferroelectric storage medium to thereby form a pattern of binary one and binary zero information bit sites.

41. The method set forth in claim 40 wherein the ferroelectric storage medium comprises a ferroelectric layer laminated with a semiconductor layer to form an interface and the polarized charges selectively written into the discrete areas comprising information bit sites on the ferroelectric layer induce corresponding depletion regions or accumulation regions in the semiconductor layer adjacent the interface dependent upon the polarity of the charges frozen into the ferroelectric layer.

42. The method set forth in claim 41 further including selectively probing the semiconductor layer depletion regions and accumulation regions adjacent the interface with the selectively directed beam of electrons during a subsequent read-out operation to derive output electric signals representative of the information stored in the charge pattern formed on the ferroelectric layer.

43. The method set forth in claim 40 wherein a polarizing potential is applied to the ferroelectric storage member during heating up of the selected discrete areas which is reverse in polarity to the polarizing potential applied during cooling and hence to the polarity of the charge frozen-in at a given information bit site whereby the storage medium is subjected to alternate polarity polarizing potentials during the respective heating and cooling phases of each writing operation to thereby minimize disturbance effects on adjacent information bit sites.

44. A ferroelectric/semiconductor information storage member comprising a thin ferroelectric layer laminated with a semiconductor layer to form an interface and having thin metal films formed on the remaining flat surfaces only of the ferroelectric layer and the semiconductor layer, respectively to thereby form a metal-ferroelectric-semiconductor-metal capacitor sandwich memory structure, the ferroelectric layer comprising a ferroelectric film having a thickness of a few thousand angstroms formed on a bulk semiconductor substrate having a thickness on the order of 0.2 millimeters and the metal films have a thickness on the order of 100 to 500 angstrom units.

45. A ferroelectric/semiconductor information storage member according to claim 44 wherein the ferroelectric film is formed from the class of materials consisting of $BaTiO_3$ and $Pb(Ti{\cdot}Zr{\cdot}Sn)O_3$.

46. A ferroelectric/semiconductor information storage member according to claim 45 wherein one of the metal films includes a plurality of discontinuities which divide the layer into a plurality of electrically isolated conductive lands for respective connection to different output circuits.

* * * * *